US012314011B2

(12) United States Patent
Nakatsuka et al.

(10) Patent No.: US 12,314,011 B2
(45) Date of Patent: May 27, 2025

(54) CASE AND TIMEPIECE

(71) Applicant: Casio Computer Co., Ltd., Tokyo (JP)

(72) Inventors: Yoshiki Nakatsuka, Higashiyamato (JP); Takao Matsuda, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 18/534,511

(22) Filed: Dec. 8, 2023

(65) Prior Publication Data

US 2024/0134317 A1 Apr. 25, 2024
US 2024/0231278 A9 Jul. 11, 2024

Related U.S. Application Data

(63) Continuation of application No. 17/444,827, filed on Aug. 10, 2021, now Pat. No. 11,880,166.

(30) Foreign Application Priority Data

Aug. 20, 2020 (JP) ................................ 2020-139229

(51) Int. Cl.
*G04B 37/05* (2006.01)
*G04G 17/08* (2006.01)

(52) U.S. Cl.
CPC ............ *G04B 37/05* (2013.01); *G04G 17/08* (2013.01)

(58) Field of Classification Search
CPC ...... G04G 17/08; G04B 37/05; G04B 37/052; G04B 37/081; G04B 37/0008; G04B 37/225; G04B 43/002; G04C 3/001
See application file for complete search history.

(56) References Cited

U.S. PATENT DOCUMENTS 5,442,602 A * 8/1995 Hirai .................... G04B 37/005 368/286
6,310,835 B1 10/2001 Mantoan et al.
6,762,976 B1 7/2004 Tamaru et al.
7,230,885 B2 6/2007 Sakurazawa et al.
8,708,552 B2 4/2014 Ueno
8,773,847 B2 7/2014 Byun et al.
9,523,963 B2 12/2016 Fujisawa et al.
(Continued)

FOREIGN PATENT DOCUMENTS

JP S62-93787 U 6/1987
JP 2000-329869 A 11/2000
(Continued)

OTHER PUBLICATIONS

Notice of Reasons for Refusal dated Jun. 30, 2022 received in Japanese Patent Application No. JP 2020-139229.
(Continued)

*Primary Examiner* — Edwin A. Leon
(74) *Attorney, Agent, or Firm* — Scully, Scott, Murphy & Presser, P.C.

(57) ABSTRACT

A case including a case main body, a first exterior case which is arranged around an outer circumferential portion of the case main body, and a second exterior case which includes an impact receiving portion that is opposed to an inner circumferential portion of at least one of an upper part and a lower part of the first exterior case, and is attached to at least one of the upper part and the lower part of the first exterior case.

21 Claims, 6 Drawing Sheets

(56) References Cited

U.S. PATENT DOCUMENTS

| | | | | |
|---|---|---|---|---|
| 9,766,597 | B2 | 9/2017 | Fujisawa et al. | |
| 9,869,975 | B2 | 1/2018 | Fujisawa et al. | |
| 10,747,180 | B2 | 8/2020 | Ichimura | |
| 10,928,781 | B2 | 2/2021 | Nagasawa et al. | |
| 2005/0047282 | A1 | 3/2005 | Sakurazawa et al. | |
| 2011/0235475 | A1* | 9/2011 | Shindo | G04B 43/002 368/287 |
| 2016/0062316 | A1 | 3/2016 | Maruyama | |
| 2016/0161920 | A1 | 6/2016 | Fujisawa et al. | |
| 2017/0060099 | A1 | 3/2017 | Fujisawa et al. | |
| 2017/0343964 | A1 | 11/2017 | Fujisawa et al. | |
| 2018/0292789 | A1 | 10/2018 | Ichimura | |
| 2019/0033792 | A1 | 1/2019 | Nagasawa et al. | |
| 2020/0272105 | A1* | 8/2020 | Hirayama | G04B 37/08 |

FOREIGN PATENT DOCUMENTS

| | | | |
|---|---|---|---|
| JP | 2001099956 | A | 4/2001 |
| JP | 2001194471 | A | 7/2001 |
| JP | 3633446 | B2 | 3/2005 |
| JP | 2005098975 | A | 4/2005 |
| JP | 2006-112892 | A | 4/2006 |
| JP | 4805437 | B2 | 11/2011 |
| JP | 2013054044 | A | 3/2013 |
| JP | 2016176725 | A | 10/2016 |
| JP | 6459455 | B2 | 1/2019 |
| JP | 2019027854 | A | 2/2019 |
| JP | 2020098145 | A | 6/2020 |

OTHER PUBLICATIONS

Office Action dated Jun. 21, 2023 received in U.S. Appl. No. 17/444,827.

Notice of Allowance dated Sep. 28, 2023 received in United States Patent Application No. U.S. Appl. No. 17/444,827.

Notice of Reasons for Refusal dated Jun. 4, 2024 received in Japanese Patent Application No. JP 2022-144363.

* cited by examiner

CASE AND TIMEPIECE

CROSS-REFERENCE TO RELATED APPLICATIONS

This application is a continuation of U.S. application Ser. No. 17/444,827 filed on Aug. 10, 2021, which is based upon and claims the benefit of priority from the prior Japanese Patent Applications No. 2020-139229, filed Aug. 20, 2020, the entire contents of each of which are incorporated herein by reference.

BACKGROUND

1. Technical Field

The technical field relates to a case that is used for an electronic device such as a wristwatch, and a timepiece having the case.

2. Description of the Related Art

A wristwatch case is known which has a structure where an exterior member has been attached to the outer circumferential portion of a case main body by a plurality of screws, as described in Japanese Patent Application Laid-Open (Kokai) Publication No. 2000-329869. In this wristwatch case, the exterior member includes an interior section which is formed of a hard synthetic resin, and an exterior section which is formed of a soft synthetic resin and covers the interior section.

SUMMARY

One embodiment is a case comprising: a case main body; a first exterior case which is arranged around an outer circumferential portion of the case main body, and a second exterior case which includes an impact receiving portion that is opposed to an inner circumferential portion of at least one of an upper part and a lower part of the first exterior case, and is attached to at least one of the upper part and the lower part of the first exterior case.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

An embodiment of a wristwatch will hereinafter be described with reference to FIG. 1 to FIG. 5.

Figure 1:
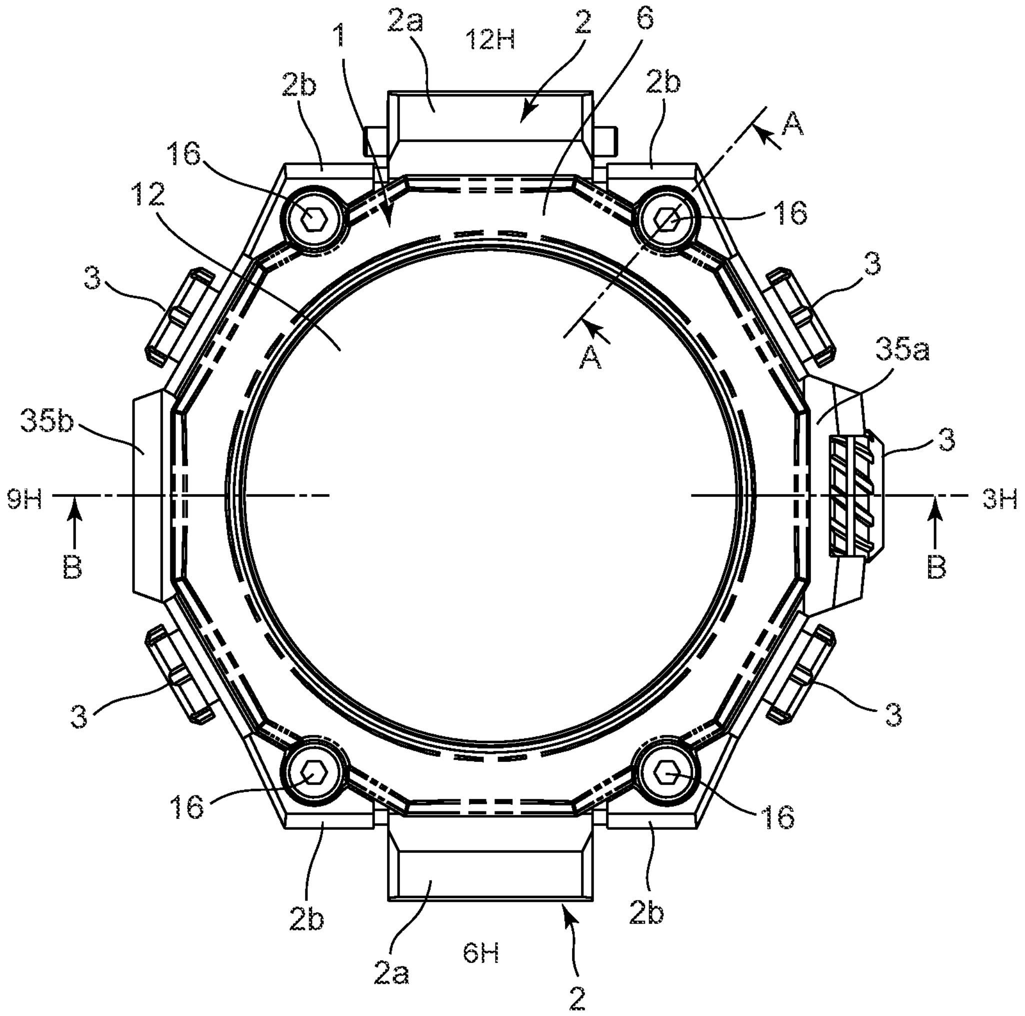
FIG. 1 is an enlarged front view showing an embodiment of a wristwatch.

This wristwatch includes a wristwatch case 1, as shown in FIG. 1. On the twelve o'clock side and six o'clock side of the wristwatch case 1, band attachment sections 2 are provided to which watch bands (not shown in the drawings) are attached. Also, on the two o'clock side, three o'clock side, four o'clock side, eight o'clock side, and ten o'clock side of the wristwatch case 1, switch devices 3 are provided.

The wristwatch case 1 includes a case main body 4, a first exterior case 5 which is arranged covering the outer circumferential portion of the case main body 4, and a second exterior case 6 which is arranged on the upper part of the first exterior case 5 (the front surface in FIG. 1 or the upper surface in FIG. 2 to FIG. 5) and the upper part of the case main body 4 (the front surface in FIG. 1 or the upper surface in FIG. 2 to FIG. 5), as shown in to FIG. 1 to FIG. 4. The case main body 4, which houses a timepiece module 7, is structured to include a cylindrical outer circumferential section 4*a* and a plate-shaped bottom section 4*b* which are made of a hard synthetic resin and integrally formed.

Figure 2:
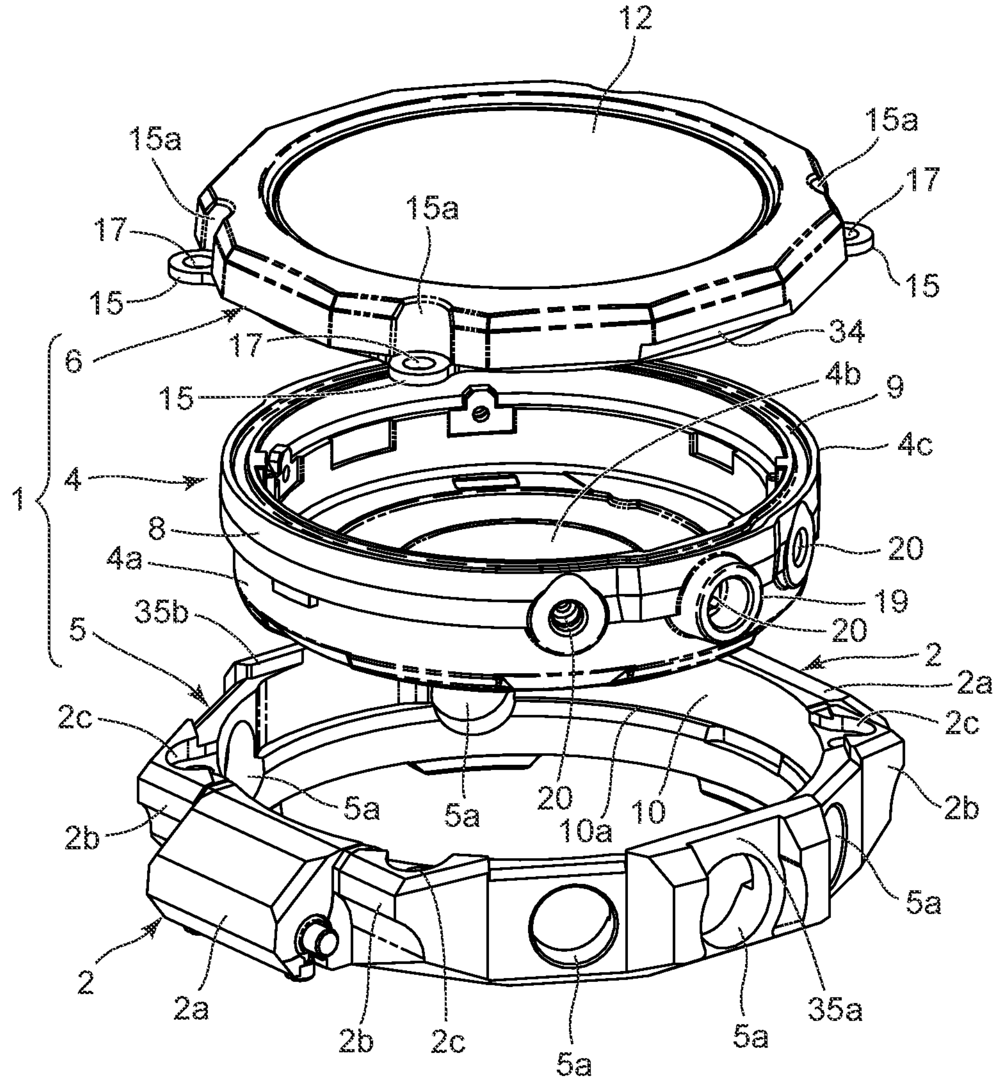
FIG. 2 is an enlarged perspective view showing the wristwatch case of FIG. 1 in a disassembled state.
Figure 3:
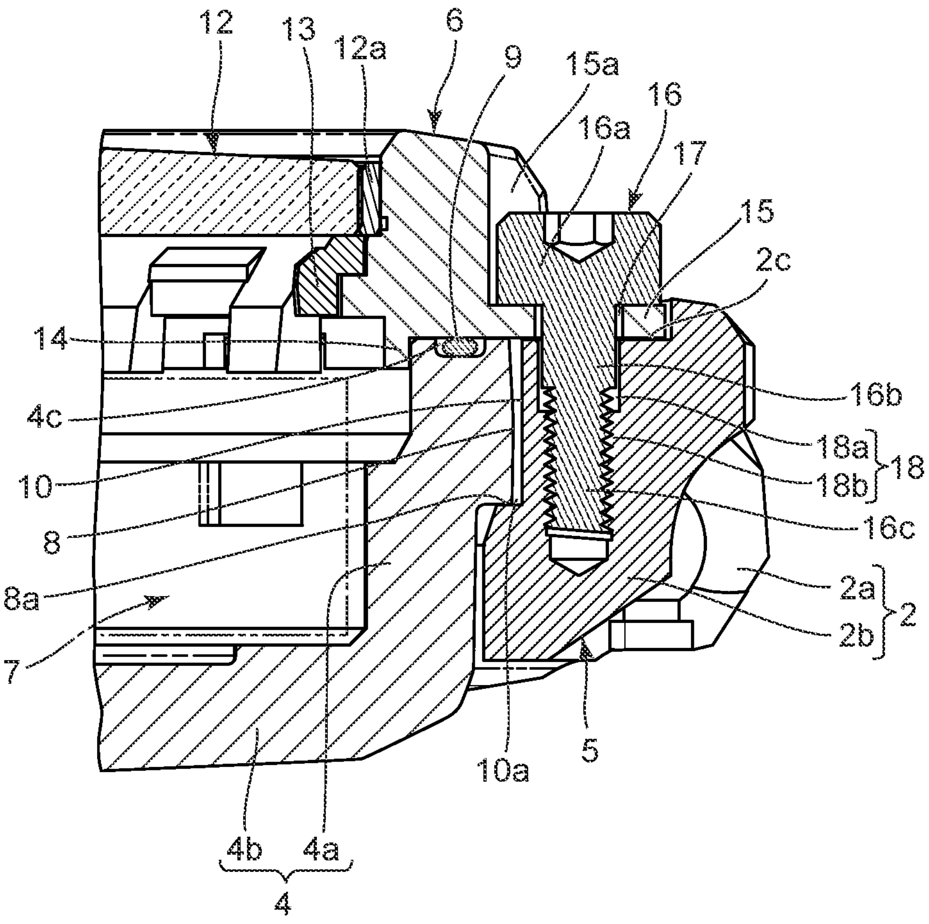
FIG. 3 is an enlarged cross-sectional view of a main portion of the wristwatch taken along the A-A arrow view shown in FIG. 1.
Figure 4:
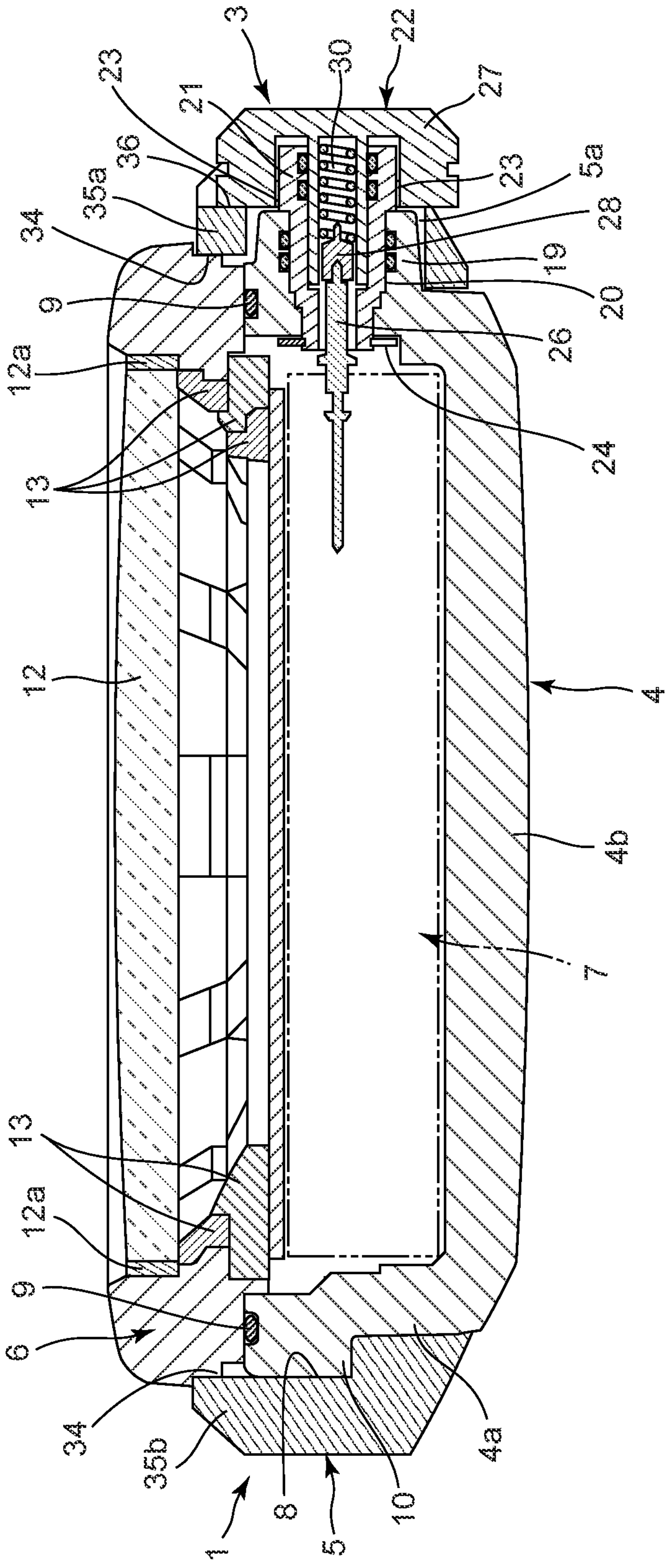
FIG. 4 is an enlarged cross-sectional view of the wristwatch taken along the B-B arrow view shown in FIG. 1.

More specifically, this case main body 4 is formed of a hard synthetic resin having high rigidity, which is acquired by, for example, glass fiber or carbon fiber being mixed into a hard synthetic resin such as polyether ether ketone resin (PEEK resin) or polyamide resin, as shown in FIG. 2 to FIG. 4. On the outer circumferential surface of the outer circumferential section 4*a* of the case main body 4, an engaging retaining section 8 is provided. This engaging retaining section 8 is provided projecting from the outer circumferential surface of the upper part of the outer circumferential section 4*a*.

Note that, although the engaging retaining section 8 should preferably be provided extending around the entire outer circumferential surface of the outer circumferential section 4*a* as shown in FIG. 2 to FIG. 4, it may be partially provided. This engaging retaining section 8 is formed such that its projection length from the outer circumferential surface of the outer circumferential section 4*a* is sufficiently shorter than the thickness of the case main body 4, such as about one third to a quarter of the thickness of the lower part of the outer circumferential section 4*a*.

In the upper end surface of the case main body 4, a packing groove 4*c* into which a case packing 9 is fitted is provided extending along the entire circumference of the case main body 4, as shown in FIG. 2 to FIG. 4. The case packing 9 has a ring shape as a whole and its cross-sectional shape is substantially circular. The packing groove 4*c* is formed such that its depth is substantially equal to the radius of the cross-section of the case packing 9. As a result, when the case packing 9 is fitted into the packing groove 4*c*, about half of the case packing 8 on the upper side is exposed upward from the upper end surface of the case main body 4.

The first exterior case 5 is formed of a metal whose rigidity is higher than the case main body 4, such as stainless steel, and has a substantially ring shape, as shown in FIG. 1 to FIG. 4. In the inner circumferential surface of this first exterior case 5, an engaging recess section 10 is provided with which the engaging retaining section 8 of the case main body 4 is engaged. This engaging recess section 10 is provided on the upper side of the inner circumferential surface of the first exterior case 5. That is, this engaging recess section 10 is provided to be located from a middle portion of the inner circumferential surface of the first exterior case 5 to the upper end surface of the first exterior case 5.

As a result, the first exterior case 5 is structured such that, when it is attached to the outer circumferential portion of the case main body 4 from below and the engaging retaining section 8 of the case main body 4 engages with the engaging recess section 10, a lower end section 8*a* of the engaging retaining section 8 comes in contact with a lower end section 10*a* of the engaging recess section 10, whereby the case main body 4 is not downwardly slipped out from the first exterior case 5, as shown in FIG. 2 and FIG. 3.

Also, on the twelve o'clock side and six o'clock side of the first exterior case 5, the band attachment sections 2 of the wristwatch case 1 are provided projecting outward, as shown in FIG. 1 to FIG. 3. Of these band attachment sections 2, the band attachment section 2 on the six o'clock side includes a connection projection section 2*a* which projects obliquely downward from an outer circumferential portion corresponding to the six o'clock point and to which a watch band (not shown in the drawings) is attached, and substantially triangular attachment projection sections 2*b* which are provided on portions corresponding to the five o'clock point and the seven o'clock point and are opposed to an end of the watch band. The connection projection section 2*a* projects further outward than the attachment projection sections 2*b* located to its sides.

Also, as with the band attachment section 2 on the six o'clock side, the band attachment section 2 on the twelve o'clock side includes a connection projection section 2*a* which projects obliquely downward from an outer circumferential portion corresponding to the twelve o'clock point and to which a watch band (not shown in the drawings) is attached, and substantially triangular attachment projection sections 2*b* which are provided on portions corresponding to the one o'clock point and the eleven o'clock point and are opposed to an end of the watch band, as shown in FIG. 1 to FIG. 3.

In the upper end surface of each attachment projection section 2*b* of each band attachment section 2, a substantially circular bearing surface section 2*c* is provided in a manner to be recessed in an area excluding outer peripheral edges of the upper end surface, as shown in FIG. 1 to FIG. 3. These bearing surface sections 2*c* are formed such that their bearing surfaces, that is, their bottom surfaces are positioned slightly lower than the upper end surface of the case main body 4.

More specifically, the bearing surface sections 2*c* of the attachment projection sections 2*b* of the band attachment sections 2 are formed such that their bearing surfaces are positioned slightly lower than the upper end surface of the case main body 4 when the first exterior case 5 is attached to the outer circumferential portion of the case main body 4 and the engaging retaining section 8 of the case main body 4 engages with the engaging recess section 10 of the first exterior case 5 in a manner that the lower end section 8*a* of the engaging retaining section 8 comes in contact with the lower end section 10*a* of the engaging recess section 10, as shown in FIG. 3.

On the other hand, the second exterior case 6, which is arranged on and attached to the upper ends of the case main body 4 and the first exterior case 5, is made of a metal such as stainless steel and has a substantially ring shape as with the first exterior case 5, as shown in FIG. 1 to FIG. 3. This second exterior case 6 is formed such that its circumferential portion is thicker than that of the first exterior case 5.

Also, to the inside of the second exterior case 6, a watch glass 12 is attached via a glass packing 12*a*, as shown in FIG. 1 to FIG. 3. By this attached watch glass 12 enhancing rigidity, the second exterior case 6 has a higher rigidity than the first exterior case 5. In this second exterior case 6, a ring-shaped parting member 13 is provided to be positioned under the watch glass 12.

Moreover, on the lower end surface of the second exterior case 6, a position restriction section 14 is provided projecting downward, as shown in FIG. 3. This position restriction section 14 is structured to come in contact with and fitted into the inner circumferential surface of the case main body 4 so as to restrict the position of the second exterior case 6 to the upper end of the case main body 4 when the lower end surface of the second exterior case 6 is arranged on the upper end surface of the case main body 4.

Furthermore, on half of the second exterior case 6 on the twelve o'clock side and another half thereof on the six o'clock side, fixing sections 15 are provided projecting from the outer circumferential surface of the second exterior case 6, and are arranged in the substantially circular bearing surface sections 2*c* provided in the attachment projection sections 2*b* of the band attachment sections 2 of the first exterior case 5, as shown in FIG. 1 to FIG. 3. Among these fixing sections 15, the fixing sections 15 on the six o'clock side are formed having a substantially disk shape and correspond to the five o'clock point and the seven o'clock point. Similarly, the fixing sections 15 on the twelve o'clock side are formed having a substantially disk shape and correspond to the one o'clock point and the eleven o'clock point.

Each fixing section 15 of the second exterior case 6 is formed in a substantially disk shape such that its size is equal to that of each bearing surface section 2*c* provided in the upper ends of the attachment projection sections 2*b* of the first exterior case 5 and its thickness in a vertical direction is substantially equal to the depth of each bearing surface section 2*c*, as shown in FIG. 2 and FIG. 3. That is, these fixing sections 15 are structured to be arranged in the bearing surface sections 2*c* of the plurality of the attachment projection sections 2*b* when the second exterior case 6 is arranged on the first exterior case 5.

Also, in portions of the outer circumferential surface of the second exterior case 6 corresponding to the plurality of the fixing sections 15, cutout sections 15*a* having a substantially semi-circular shape are provided to be located above the fixing sections 15, as shown in FIG. 1 to FIG. 3. More specifically, these cutout section 15*a* are formed by portions of the outer circumferential surface of the second exterior case 6 above and excluding the fixing sections 15, which correspond to the bearing surface sections 2*c* provided in the upper ends of the attachment projection sections 2*b* of the band attachment sections 2 of the first exterior case 5, being cut out in a groove shape whose cross-sectional shape is substantially semi-circular.

The second exterior case 6 is attached to the first exterior case 5 by screw members 16 that are fastening members, as shown in FIG. 1 and FIG. 3. Each screw member 16 includes a head section 16*a*, a neck section 16*b*, and a screw section 16*c*. The head section 16*a* is formed such that its outer diameter is substantially equal to that of each fixing section 15 of the second exterior case 6. In each fixing section 15, a screw insertion hole 17 into which the neck section 16*b* of the corresponding screw member 16 is inserted is provided penetrating in the vertical direction.

Also, in the bearing surface sections 2*c* provided in the upper ends of the attachment projection sections 2*b* of the band attachment sections 2 on the first exterior case 5, screw attachment holes 18 are provided coaxially with the screw insertion holes 17 of the fixing sections 15 of the second exterior case 6, as shown in FIG. 2 to FIG. 4. Each screw attachment hole 18 includes a neck insertion hole section 18*a* into which the neck section 16*b* of the corresponding screw member 16 is inserted and a screw hole section 18*b* into which the screw section 16*c* of the corresponding screw member 16 is screwed, and these sections are coaxially formed.

As a result, the second exterior case 6 and the first exterior case 5 are structured such that, when the second exterior case 6 is arranged on the upper ends of the case main body 4 and the first exterior case 5, and the fixing sections 15 of the second exterior case 6 are arranged in the bearing surface sections 2*c* of the attachment projection sections 2*b* of the first exterior case 5, the screw insertion holes 17 provided in the fixing sections 15 of the second exterior case 6 coaxially correspond to the screw attachment holes 18 provided in the bearing surface sections 2*c* of the attachment projection sections 2*b*, as shown in FIG. 3.

Accordingly, the screw members 16 are structured such that the screw sections 16*c* are inserted into the screw insertion holes 17 from above, inserted into the screw attachment holes 18, and screwed into the screw hole sections 18*b* with the second exterior case 6 being arranged on the upper ends of the case main body 4 and the first exterior case 5 and the screw insertion holes 17 in the fixing sections 15 of the second exterior case 6 coaxially corresponding to the screw attachment holes 18 in the bearing surface sections 2*c* provided in the upper ends of the attachment projection sections 2*b* of the first exterior case 5, as shown in FIG. 4.

Also, each screw member 16 is structured to be tightened with its neck section 16*b* being inserted into the corresponding screw insertion hole 17 and the neck insertion hole section 18*a* of the corresponding screw attachment hole 18, its head section 16*a* covering the corresponding fixing section 15 of the second exterior case 6, and a portion of the head section 16*a*, or more specifically, a semicircular half of the head section 16*a* being arranged in the corresponding cutout section 15*a* above the fixing section 15, when its screw section 16*c* is inserted from above into the screw insertion hole 17 in the fixing section 15 of the second exterior case 6 and the screw attachment hole 18 of the bearing surface section 2*c* of the corresponding attachment projection section 2*b* on the first exterior case 5, and screwed into the screw hole section 18*b* of the screw attachment hole 18, as shown in FIG. 3.

That is, each screw member 16 is structured such that, when its screw section 16*c* is screwed into the screw hole section 18*b* of the corresponding screw attachment hole 18 in the corresponding bearing surface section 2*c* of the first exterior case 5 with its head section 16*a* covering and being in contact with the corresponding fixing section 15 of the second exterior case 6, and thereby pulls the first exterior case 5 toward the second exterior case 6, the lower end section 8*a* of the engaging retaining section 8 of the case main body 4 is pulled upward by the lower end section 10*a* of the engaging recess section 10 of the first exterior case 5, and the upper end surface of the case main body 4 is pressed against the lower end surface of the second exterior case 6, whereby the second exterior case 6 is attached to the case main body 4 through the intermediary of the first exterior case 5, as shown in FIG. 4.

Also, the case main body 4 and the second exterior case 6 are structured such that, when they are attached to each other by the screw members 16, the lower end surface of the second exterior case 6 presses down the case packing 9 in the packing groove 4*c* of the case main body 4 so as to compress and deform the case packing 9 toward the inside of the packing groove 4*c*, and waterproofing between the upper end surface of the case main body 4 and the lower end surface of the second exterior case 6 is achieved by this compressed and deformed case packing 9, as shown in FIG. 3.

Figure 5:
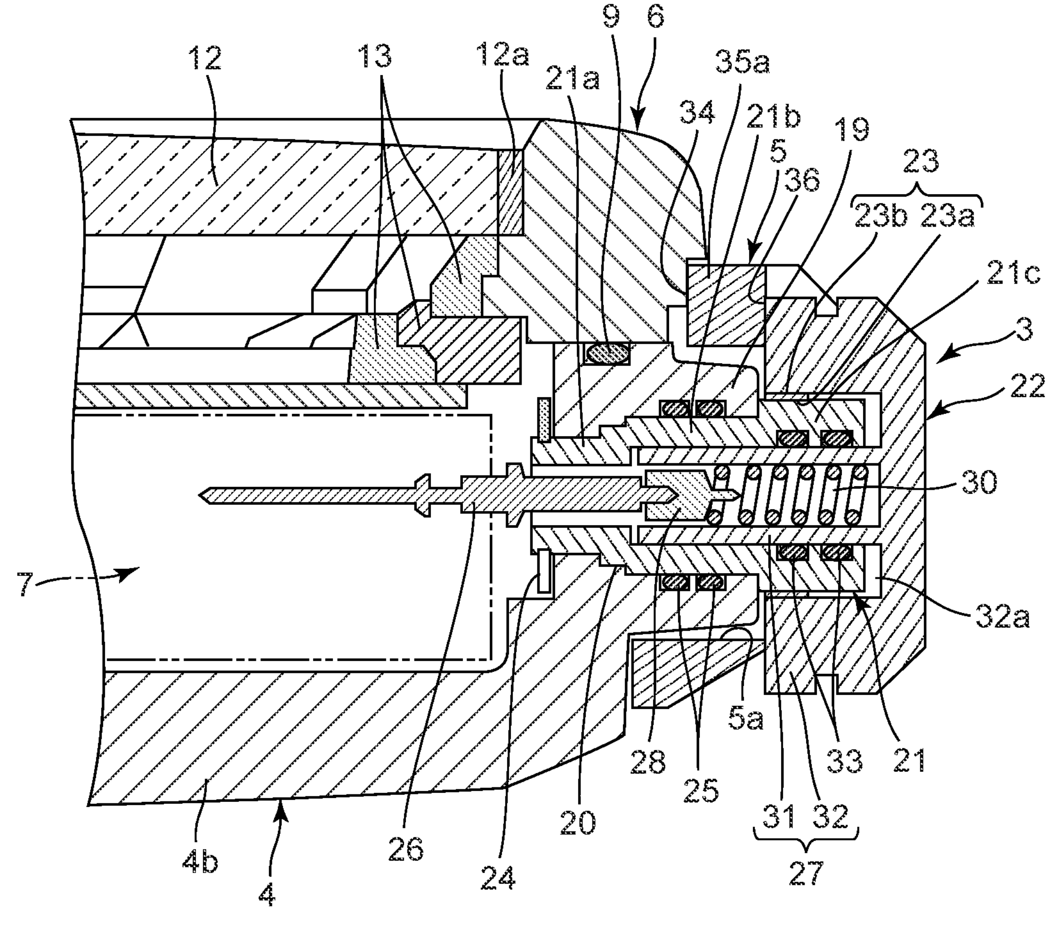
FIG. 5 is a further enlarged cross-sectional view of a main portion of the wristwatch shown in FIG. 4.

Among the plurality of switch devices 3, the four switch devices 3 on the two o'clock side, the four o'clock side, the eight o'clock side, and the ten o'clock side are push-button switches, as shown in FIG. 1. The switch device 3 on the three o'clock side is a winder switch, as shown in FIG. 4 and FIG. 5. This switch device 3 on the three o'clock side includes a cylindrical member 21 which is fitted into a penetration hole 20 of the case main body 4, an operation member 22 which is inserted into the cylindrical member 21 and protrudes outside of the case main body 4, and a lock section 23 which locks the operation member 22.

On the outer circumferential surface of the case main body 4, a cylindrical holding section 19 which holds an outer end portion of a small diameter cylindrical section 21*a* of the cylindrical member 21 is provided to be positioned coaxially with the penetration hole 20 and to project outward, as shown in FIG. 4 and FIG. 5. That is, the penetration hole 20 of the case main body 4 is provided extending from the inner circumferential surface of the case main body 4 to the outer end surface of the cylindrical holding section 19 provided projecting from the outer circumferential surface of the case main body 4.

Accordingly, in the first exterior case 5, an attachment hole 5*a* is provided into which the cylindrical holding section 19 of the case main body 4 is inserted, as shown in FIG. 4 and FIG. 5. On an outer circumferential portion of the first exterior case 5 around the attachment hole 5*a*, a protection projection 35*a* which protects the outer circumferential portion of a later-described operation head section 27 of the operation member 22 is provided.

The protection projection 35*a* is formed such that the thicknesses of its side portions are greater than the thickness of its portion between these side portions, as shown in FIG. 4 and FIG. 5. That is, the protection projection 35*a* is structured such that the outer circumferential portion of the operation head section 27 is vertically exposed, whereby the outer circumferential portion of the operation head section 27 can be easily held between fingers from above and below.

The cylindrical member 21 includes the above-described small diameter cylindrical section 21*a* which is inserted into a small diameter hole portion of the penetration hole 20 of the case main body 4, a medium diameter cylindrical section 21*b* which is inserted into a large diameter hole portion of the penetration hole 20, and a large diameter cylindrical section 21*c* which is arranged protruding outside of the cylindrical holding section 19 of the case main body 4, which are made of a metal such as stainless steel, as shown in FIG. 4 and FIG. 5. The inner end of the small diameter cylindrical section 21*a* of the cylindrical member 21 protrudes into the case main body 4, and a stopper member 24 such as an E ring is attached to this inner end.

Also, on the outer circumferential portion of the medium diameter cylindrical section 21*b* of this cylindrical member 21, a plurality of waterproofing packings 25 are provided, as shown in FIG. 4 and FIG. 5. These waterproofing packings 25 come in contact with the inner circumferential surface of the large diameter hole portion of the penetration hole 20, whereby waterproofing between the inner circumferential surface of the penetration hole 20 of the case main body 4 and the outer circumferential surface of the cylindrical member 21 is achieved.

The operation member 22 includes an operation shaft 26 that is a winding stem, the above-described operation head section 27 which is connected to the outer end of this operation shaft 26, a connection piece 28 which connects the operation shaft 26 with the operation head section 27, and a spring member 30 which forces the operation head section 27 outward from the case main body 4 side, as shown in FIG. 4 and FIG. 5. The inner end of the operation shaft 26 is slidably inserted into the timepiece module 7 and the outer end thereof is arranged in the cylindrical member 21.

The operation head section 27 includes a cylindrical shaft 31 which is slidably inserted into the middle diameter cylindrical section 21*b* of the cylindrical member 21, and an outer head section 32 formed on the outer end of the cylindrical shaft 31, as shown in FIG. 4 and FIG. 5. On the outer circumferential portion of the cylindrical shaft 31, a plurality of waterproofing rings 33 is provided which slidably comes in elastic contact with the inner circumferential surface of the cylindrical member 21. In this cylindrical shaft 31, the connection piece 28 and the spring member 30 are arranged. In addition, the outer end of the operation shaft 26 is inserted thereinto and connected to the connection piece 28.

The connection piece 28, which is slidably arranged in the cylindrical shaft 31, is structured not to engage with the inner circumferential surface of the cylindrical shaft 31 when the operation head section 27 is in a neutral state by being pushed outward from the case main body 4 side by the spring force of the spring member 30 so that the rotation of the operation head section 27 is not transmitted to the operation shaft 26, as shown in FIG. 4 and FIG. 5.

Also, the connection piece 28 is structured such that, when the operation head section 27 in the neutral state is further pulled outward from the case main body 4 side and the cylindrical shaft 31 is slid, this connection piece 28 is not moved but a portion of the inner circumferential surface of the cylindrical shaft 31 engages with this connection piece 28, whereby the rotation of the operation head section 27 is transmitted to the operation shaft 26, as shown in FIG. 4 and FIG. 5.

The lock section 23 is a screw lock mechanism, and includes a male screw 23*a* provided on the outer circumferential surface of the large diameter cylindrical section 21*c* of the cylindrical member 21, and a female screw 23*b* provided in the inner circumferential surface of a recess section 32*a* formed in the outer head section 32 of the operation head section 27, as shown in FIG. 4 and FIG. 5. The inner diameter of the recess section 32*a* formed in the outer head section 32 of the operation head section 27 is substantially equal to the outer diameter of the large diameter cylindrical section 21*c* of the cylindrical member 21.

As a result, the lock section 23 is structured such that, when the operation head section 27 which is in the neutral state and therefore the rotation of which does not affect the connection piece 28 is rotated in one direction while being pressed toward the inside of the case main body 4 against the spring force of the spring member 30, the male screw 23*a* of the large diameter cylindrical section 21*c* engages with the female screw 23*b* of the recess section 32*a* while the large diameter cylindrical section 21*c* of the cylindrical member 21 is pressed into the recess section 32*a* of the outer head section 32 of the operation head section, whereby the operation head section 27 is locked, as shown in FIG. 4 and FIG. 5.

Also, the lock section 23 is structured such that, when the operation head section 27 is rotated in the other direction with the male screw 23*a* of the large diameter cylindrical section 21*c* being engaged with the female screw 23*b* of the recess section 32*a*, the male screw 23*a* of the large diameter cylindrical section 21*c* is disengaged from the female screw 23*b* of the recess section 32*a* and the locked state by the male screw 23*a* and the female screw 23*b* is released, whereby the operation head section 27 is pushed outward from the case main body 4 side by the spring force of the spring member 30 so as to be brought into the neutral state, as shown in FIG. 4 and FIG. 5.

That is, the switch device 3 on the three o'clock side is structured such that, since the cylindrical shaft 31 of the operation head section 27 and the connection piece 28 do not engage with each other when the operation head section 27 is in the neutral state by the locking of the operation head section 27 by the lock section 23 being released and the operation head section 27 being pushed outward from the case main body 4 side by the spring force of the spring member 30, the connection piece 28 and the operation shaft 26 do not rotate and the timepiece movement (not shown in the drawings) of the timepiece module 7 cannot be operated even if the operation head section 27 is rotated, whereby time correction is not performed, as shown in FIG. 4 and FIG. 5.

Also, the switch device 3 on the three o'clock side is structured such that, when the locking of the operation head section 27 by the lock section 23 is released and the operation head section 27 in the neutral state is further pulled outward from the case main body 4 side, the cylindrical shaft 31 of the operation head section 27 and the connection piece 28 engage with each other, whereby the connection piece 28 is rotated in conjunction with the rotation of the operation head section 27 and the operation shaft 26 is rotated in the timepiece module 7 so that the timepiece movement (not shown in the drawings) of the timepiece module 7 is operated for time correction, as shown in FIG. 4 and FIG. 5.

In the second exterior case 6, impact receiving sections 34 that are sections for receiving impacts are formed on two portions including a portion corresponding to the switch device 3 on the three o'clock side and a portion corresponding to the nine o'clock side which is located diagonally thereto, as shown in FIG. 4 and FIG. 5. The impact receiving sections 34 herein are structured such that the inner end surface (inner peripheral portion) of the protection projection 35*a* of the first exterior case 5 on the three o'clock side and the inner end surface (inner peripheral portion) of an ornament projection 35*b* on the nine o'clock side come in contact with these impact receiving sections 34 when the first exterior case 5 is subjected to an external impact. In other words, these impact receiving sections 34 are structured such that, when the first exterior case 5 is subjected to an external impact, the inner circumferential portions of the first exterior case 5 come in contact with these impact receiving sections 34 regardless of the direction of the impact.

More specifically, among the plurality of impact receiving sections 34, the impact receiving section 34 on the three o'clock side is provided in a lower portion of the outer circumferential surface of the second exterior case 6 on the three o'clock side which corresponds to the protection projection 35*a* of the first exterior case 5, as shown in FIG. 4 and FIG. 5. Also, the impact receiving section 34 on the nine o'clock side is provided in a lower portion of the outer circumferential surface of the second exterior case 6 on the nine o'clock side which corresponds to the ornament projection 35*b* provided on a portion of the outer circumferential surface of the first exterior case 5 located diagonally to the protection projection 35*a* of the first exterior case 5 while projecting upward.

Also, on the protection projection 35*a* of the first exterior case 5, a head contact section 36 is provided with which the operation head section 27 of the operation member 22 comes in contact when the operation head section 27 is locked by the lock section 23, as shown in FIG. 4 and FIG. 5. The head contact section 36 of the first exterior case 5 herein is structured such that, when the female screw 23*b* of the recess section 32*a* engages with the male screw 23*a* of the large diameter cylindrical section 21*c* while the large diameter cylindrical section 21*c* of the cylindrical member 21 is pressed into the recess section 32*a* of the outer head section 32 of the operation head section so as to lock the operation head section 27, the inner end of the operation head section 27 comes in contact with this head contact section 36.

That is, this wristwatch case 1 is structured such that, when the operation head section 27 of the operation member 22 of the switch device 3 on the three o'clock side is subjected to an external impact with the operation member 22 being locked by the lock section 23, the impact is transmitted to the head contact section 36 of the protection projection 35*a* of the first exterior case 5, and the inner end surface of the protection projection 35*a* of the first exterior case 5 on the three o'clock side comes in contact with the impact receiving section 34 of the second exterior case 6 on the three o'clock side by the impact transmitted to the head contact section 36, whereby the impact receiving section 34 receives the impact, as shown in FIG. 4 and FIG. 5.

As a result, this wristwatch case 1 is structured such that, when the operation head section 27 of the operation member 22 of the switch device 3 on the three o'clock side is subjected to an external impact, the impact is received by the second exterior case 6 via the first exterior case 5, whereby the case main body 4 made of a synthetic resin is not subjected to the external impact, as shown in FIG. 4 and FIG. 5.

Accordingly, the switch device 3 on the three o'clock side is structured such that, even if the operation head section 27 of the operation member 22 is subjected to an external impact, the impact is received by the impact receiving section 34 of the second exterior case 6 and therefore the operation shaft 26 of the operation member 22 is not pushed into the timepiece module 7 by the impact, whereby the timepiece module 7 is prevented from being damaged by the operation shaft 26, as shown in FIG. 4 and FIG. 5.

Also, this wristwatch case 1 is structured such that, when an outer circumferential portion of the first exterior case 5 on the nine o'clock side is subjected to an external impact, the inner end surface of the ornament projection 35*b* of the first exterior case 5 on the nine o'clock side comes in contact with the impact receiving section 34 of the second exterior case 6 on the nine o'clock side by the impact, whereby the impact receiving section 34 receives the impact, as shown in FIG. 4.

As a result, this wristwatch case 1 is structured such that, when an outer circumferential portion of the first exterior case 5 on the nine o'clock side is subjected to an external impact, the impact is received by the second exterior case 6 via the first exterior case 5, whereby the case main body 4 made of a synthetic resin is not subjected to the impact, as shown in FIG. 4.

Also, as for the second exterior case 6, its rigidity as a whole is enhanced by the watch glass 12 being fitted thereinto via the glass packing 12*a*, as shown in FIG. 2 and FIG. 4. As a result, the second exterior case 6 is structured such that, when an outer circumferential portion of the first exterior case 5 is subjected to an external impact, this second exterior case 6 having enhanced rigidity by the watch glass 12 reliably receives the impact by the impact receiving sections 34 on the three o'clock side and the nine o'clock side.

Next, an assembly procedure for this wristwatch case 1 is described.

In this assembly, first, the first exterior case 5 is attached to the outer circumferential portion of the case main body 4. Here, before this attachment, the cylindrical member 21 is attached to the penetration hole 20 on the three o'clock side of the case main body 4 together with the plurality of waterproofing packings 25. In this state, the first exterior case 5 is attached to the case main body 4 from below, whereby the engaging retaining section 8 provided on the outer circumferential section 4*a* of the case main body 4 is engaged with the engaging recess section 10 provided in the inner circumferential surface of the first exterior case 5.

As a result, the lower end section 10*a* of the engaging recess section 10 of the first exterior case 5 comes in contact with and held under the lower end section 8*a* of the engaging retaining section 8 of the case main body 4. Consequently, the first exterior case 5 is attached to the outer circumferential section 4*a* of the case main body 4 without being upwardly slipped out. In this state, the operation buttons of the switch devices 3 on the two o'clock side, the four o'clock side, the eight o'clock side, and the ten o'clock side among the plurality of switch devices 3 are attached, and the timepiece module 7 is mounted in the case main body 4.

In this state, the switch device 3 on the three o'clock side is attached to the wristwatch case 1. Here, before this attachment, the connection piece 28 is connected to the outer end of the operation shaft 26 of the operation member 22. In addition, the spring member 30 is inserted into the cylindrical shaft 31 provided on the operation head section 27 of the operation member 22, and then the connection piece 28 is inserted into the cylindrical shaft 31, whereby the outer end of the operation shaft 26 is arranged therein.

As a result, the operation shaft 26 is connected to the cylindrical shaft 31 of the operation head section 27 by the connection piece 28. In this state, the operation shaft 26 is inserted into the cylindrical member 21 from outside the case main body 4 so as to be inserted into the timepiece module 7 in the case main body 4. By this insertion, the operation shaft 26 is operably connected to the timepiece module 7. As a result, the switch device 3 on the three o'clock side is attached to the case main body 4.

Then, the case packing 9 is arranged protruding upward in the packing groove 4*c* provided in the upper end surface of the case main body 4. In this state, the second exterior case 6 is arranged on the upper ends of the case main body 4 and the first exterior case 5. Here, before this attachment, the parting member 13 is fitted into the second exterior case 6 from above, and the watch glass 12 and the glass packing 12*a* are attached to the second exterior case 6 in a manner to be located above the parting member 13.

By the second exterior case 6 being arranged on the upper ends of the case main body 4 and the first exterior case 5 as described above, the position restriction section 14 of the second exterior case 6 is fitted into the case main body 4 while being in contact with the inner circumferential surface of the case main body 4. As a result, the second exterior case 6 is arranged on the upper end surface of the case main body 4 with its position being restricted. Here, the impact receiving section 34 of the second exterior case 6 on the three o'clock side corresponds to the protection projection 35*a* of the first exterior case 5 on the three o'clock side, and the impact receiving section 34 of the second exterior case 6 on the nine o'clock side corresponds to the ornament projection 35*b* of the first exterior case 5 on the nine o'clock side.

Also, here, the fixing sections 15 of the second exterior case 6 are arranged on the attachment projection sections 2*b* of the band attachment sections 2 of the first exterior case 5, whereby these fixing sections 15 right below the cutout sections 15*a* of the second exterior case 6 are arranged corresponding to the bearing surface sections 2*c* of the upper end surfaces of the attachment projection sections 2*b*. As a result, the screw insertion holes 17 provided in the fixing sections 15 of the second exterior case 6 coaxially correspond to the screw attachment holes 18 provided in the bearing surface sections 2*c* of the attachment projection sections 2*b* of the first exterior case 5.

In this state, the second exterior case 6 is attached to the upper ends of the case main body 4 and the first exterior case 5 by the screw members 16. Here, the screw sections 16*c* of the screw members 16 are inserted from above into the screw insertion holes 17 of the fixing sections 15 of the second exterior case 6, and then inserted into the screw attachment holes 18 of the first exterior case 5.

Also, here, the neck sections 16*b* of the screw members 16 are inserted into the screw insertion holes 17 of the fixing sections 15 of the second exterior case 6 and the neck insertion hole sections 18*a* of the screw attachment holes 18 of the first exterior case 5, the head sections 16*a* are arranged covering the fixing sections 15 of the second exterior case 6, and the above-described portions of the head sections 16*a*, that is, the semi-circular half portions of the head sections 16*a* are arranged in the cutout sections 15*a*.

In this state, when the screw sections 16*c* of the screw members 16 are screwed into the screw hole sections 18*b* of the screw attachment holes 18 and the screw members 16 are tightened, the head sections 16*a* of the screw members 16 come in contact with and cover the upper surfaces of the fixing sections 15 of the second exterior case 6, and the screw sections 16*c* pull the first exterior case 5 toward the second exterior case 6 while being screwed into the screw hole sections 18*b* of the screw attachment holes 18.

Consequently, the lower end section 10*a* of the engaging recess section 10 of the first exterior case 5 presses the lower end section 8*a* of the engaging retaining section 8 of the case main body 4 upward. Resultantly, the lower end surface of the second exterior case 6 presses down the case packing 9 arranged in the packing groove 4*c* of the upper end surface of the case main body 4 and thereby compresses and deforms the case packing 9 toward the inside of the packing groove 4*c*, whereby the lower end surface of the second exterior case 6 approaches or comes in contact with the upper end surface of the case main body 4 and is pressed against this end surface. As a result, waterproofing between the upper end surface of the case main body 4 and the lower end surface of the second exterior case 6 is achieved by the case packing 9, and the second exterior case 6 is attached to the case main body 4 via the first exterior case 5.

Here, the first exterior case 5 is reliably pulled toward the second exterior case 6, and the case main body 4 is firmly pressed against the second exterior case 6. As a result, the case packing 9 is compressed, deformed, and tightly held between the upper end surface of the case main body 4 and the lower end surface of the second exterior case 6, whereby waterproofing between the upper end surface of the case main body 4 and the lower end surface of the second exterior case 6 is reliably achieved, and the case main body 4 is firmly attached to the second exterior case 6 via the first exterior case 5.

Next, the mechanism of the above-described wristwatch is described.

When this wristwatch is in a normal state, information such as a time of day, a date, a day of the week is displayed by the timepiece module 7 and viewed from outside through the watch glass 12. In this state, when the switch device 3 on the two o'clock side, the four o'clock side, the eight o'clock side, or the ten o'clock side among the plurality of switch devices 3 is operated, the mode of the wristwatch is switched.

Also, by the switch device 3 on the three o'clock side being operated, time correction can be performed. Here, first, the locking of the operation member 22 by the lock section 23 is released. More specifically, when the operation head section 27 is rotated in the locking state where the male screw 23*a* of the cylindrical member 21 has been engaged with the female screw 23*b* of the operation head section 27, and the female screw 23*b* is thereby separated from the male screw 23*a*, the locking by the male screw 23*a* and the female screw 23*b* is released.

Accordingly, the operation head section 27 is pushed outward from the case main body 4 side by the spring force of the spring member 30, whereby the current state is switched to the neutral state. Here, even though the cylindrical shaft 31 of the operation head section 27 is slid, the connection piece 28 is not moved and does not engage with the inner circumferential surface of the cylindrical shaft 31. Accordingly, in the neutral state, the rotation of the operation head section 27 is not transmitted to the operation shaft 26, and time correction or the like cannot be performed.

In this neutral state, when the operation head section 27 is further pulled outward from the case main body 4 side, the cylindrical shaft 31 is further slid, and the connection piece 28 engages with the inner circumferential surface of the cylindrical shaft 31 so as to be rotatable in conjunction with the rotation of the operation head section 27. In this state, when the operation head section 27 is rotated, the operation shaft 26 is rotated by the connection piece 28, and operates the timepiece movement (not shown in the drawings) of the timepiece module 7. As a result, time correction or the like is performed.

In the case of this switch device 3 on the three o'clock side, when the operation head section 27 pressed and locked to the cylindrical member 21 by the lock section 23 is subjected to an external impact, the impact is transmitted to the head contact section 36 of the protection projection 35*a* of the first exterior case 5 on the three o'clock side, and the inner end surface of the protection projection 35*a* of the first exterior case 5 on the three o'clock side comes in contact with the impact receiving section 34 of the second exterior case 6 on the three o'clock side by the impact transmitted to the head contact section 36, whereby the impact receiving section 34 receives the impact.

As such, in the wristwatch case 1, when the operation head section 27 of the operation member 22 of the switch device 3 on the three o'clock side is subjected to an external impact, the impact is received by the impact receiving section 34 of the second exterior case 6 on the three o'clock side via the first exterior case 5, whereby the case main body 4 made of a synthetic resin is not subjected to the impact. As a result of this structure, the thickness of the case main body 4 can be thinned, and the downsizing of the case main body 4 and the entire wristwatch case 1 can be achieved.

As for the switch device 3 on the three o'clock side, since external impacts are received by the impact receiving section 34 of the second exterior case 6 on the three o'clock side and therefore do not cause the operation shaft 26 of the operation member 22 to be pushed into the timepiece module 7, the timepiece module 7 can be prevented from being damaged due to the operation shaft 26 even if the operation head section 27 of the operation member 22 is subjected to an external impact. As a result of this structure, the outer head section 32 of the operation head section 27 can be protruded outside of the protection projection 35*a* so that the outer circumferential portion of the outer head section 32 can be easily held, whereby the operability of the operation head section 27 can be enhanced.

Moreover, when the ornament projection 35*b* of the first exterior case 5 on the nine o'clock side is subjected to an external impact, the inner end surface of the ornament projection 35*b* of the first exterior case 5 on the nine o'clock side comes in contact with the impact receiving section 34 of the second exterior case 6 on the nine o'clock side by the impact, whereby the impact receiving section 34 receives the impact.

Accordingly, in this wristwatch case 1, when the ornament projection 35*b* of the first exterior case 5 on the nine o'clock side is subjected to an external impact, the impact is received by the impact receiving section 34 of the second exterior case 6 on the nine o'clock side via the first exterior case 5, whereby the case main body 4 made of a synthetic resin is not subjected to the external impact.

As for the second exterior case 6, its rigidity as a whole is enhanced by the watch glass 12 being fitted thereinto via the glass packing 12*a*. Accordingly, when the outer peripheral portion of the first exterior case 5 is subjected to an external impact, the second exterior case 6 having the enhanced rigidity by the watch glass 12 reliably receives the impact by the impact receiving sections 34 on the three o'clock side and the nine o'clock side, whereby the case main body 4 made of a synthetic resin is not subjected to the impact.

In the structure of the conventional wristwatch case described above, a pipe is fitted into a penetration hole provided in the case main body, an operation shaft of a operation member is slidably inserted into the pipe, an operation head section of the operation member is arranged in a protection hole provided penetrating through the interior section and the exterior section, and the operation member is operated in this state. However, this type of wristwatch case has a problem in that, when the exterior member is subjected to an external impact, this impact is directly transmitted to the case main body. Also, when the operation head section of the operation member is subjected to an external impact, the operation shaft of the operation member is pushed into the case main body by the impact, which may cause components in the case main body to be damaged.

In contrast, the wristwatch case 1 of the present embodiment includes the case main body 4, the first exterior case 5 which is arranged around the outer circumferential portion of the case main body 4 and holds the case main body 4, and the second exterior case 6 which is attached to the upper part of the first exterior case while covering the upper part of the case main body 4 and has the impact receiving sections 34 with which the inner peripheral portions of the upper part of the first exterior case 5 come in contact, whereby impact resistance is enhanced.

That is, in the case of this wristwatch case 1, when the first exterior case 5 is subjected to an external impact, the inner end surface of the first exterior case 5 comes in contact with the impact receiving sections 34 of the second exterior case 6 by the impact, whereby the impact receiving sections 34 receives the impact. As a result of this structure by which the case main body 4 is not subjected to external impacts, the impact resistance of the case main body 4 is enhanced. Moreover, when the first exterior case 5 is subjected to an external impact, the inner end surface of the first exterior case 5 comes in contact with the impact receiving sections 34 of the second exterior case 6 by the impact regardless of the direction of the impact, whereby the impact receiving sections 34 receives the impact regardless of the direction of the impact. As a result of this structure by which the case main body 4 is not subjected to any external impact regardless of the direction of the impact, the impact resistance of the case main body 4 is enhanced, and the deformation of the first exterior case 5 is suppressed.

Also, in the case of this wristwatch case 1, the thickness of the circumferential portion of the second exterior case 6 is greater than that of the first exterior case 5. Accordingly, when the inner end surface of the first exterior case 5 comes in contact with the impact receiving sections 34 of the second exterior case 6 by an external impact, the impact is reliably and favorably received by the impact receiving sections 34 of the second exterior case 6 whose thicknesses are greater than that of the circumferential portion of the first exterior case 5.

Moreover, in the case of this wristwatch case 1, the case main body 4 is formed of a synthetic resin and the first exterior case 5 and the second exterior case 6 are formed of a metal whose rigidity is higher than that of the case main body 4. Accordingly, even though the case main body 4 is formed of a synthetic resin, the first exterior case 5 can reliably receive external impacts by the impact receiving sections 34 of the second exterior case 6.

As described above, in the case of this wristwatch case 1 where the case main body 4 is not subjected to external impacts, the impact resistance for the case main body 4 can be enhanced. Accordingly, in the case of this wristwatch case 1, the case main body 4 can be thinly formed, whereby the downsizing of the case main body 4 and the entire wristwatch case 1 can be achieved.

Also, in this wristwatch case 1, the watch glass 12 is fitted into the second exterior case 6 via the glass packing 12*a*, whereby the rigidity of the entire second exterior case 6 is enhanced. As a result, when the outer peripheral portion of the first exterior case 5 is subjected to an external impact, the impact receiving sections 34 of the second exterior case 6 having the enhanced rigidity by the watch glass 12 reliably and favorably receives the impact.

Moreover, in the case of this wristwatch case 1, the impact receiving sections 34 of the second exterior case 6 are provided diagonally to each other. That is, the impact receiving sections 34 are not necessarily required to be provided on the entire outer circumferential portion of the second exterior case 6, and are only required to be provided on two diagonal portions on the three o'clock side and the nine o'clock side which tend to be subjected to external impacts. By this structure, in this wristwatch case 1, the impact receiving sections 34 can be efficiently provided, whereby the second exterior case 6 can be easily manufactured.

Furthermore, in this wristwatch case 1, the switch device 3 on the three o'clock side is provided on the case main body 4, the protection projection 35*a* which protects the operation head section 27 of the switch device 3 on the three o'clock side is provided on the first exterior case 5, and the impact receiving sections 34 of the second exterior case 6 are provided diagonally to each other while corresponding to the protection projection 35*a* of the first exterior case 5. As a result, even if the protection projection 35*a* and the ornament projection 35*b* provided diagonally to the protection projection 35*a* are subjected to external impacts, the impacts can be received by each impact receiving section 34 of the second exterior case 6.

That is, in the case of this wristwatch case 1, when the protection projection 35*a* which protects the operation head section 27 of the switch device 3 on the three o'clock side is subjected to an external impact, the impact is reliably received by the impact receiving section 34 of the second exterior case 6 on the three o'clock side. Also, when the ornament projection 35*b* on the nine o'clock side which is located diagonally to the protection projection 35*a* is subjected to an external impact, the impact is reliably received by the impact receiving section 34 of the second exterior case 6 on the nine o'clock side.

Still further, in this wristwatch case 1, the head contact section 36 with which the inner end of the operation head section 27 of the switch device 3 on the three o'clock side comes in contact is provided on the protection projection 35*a* of the first exterior case 5. As a result, when the operation head section 27 is subjected to an external impact, the operation head section 27 comes in contact with the head contact section 36 of the protection projection 35*a* of the first exterior case 5 on the three o'clock side by the impact, and the inner end surface of the protection projection 35*a* of the first exterior case 5 on the three o'clock side comes in contact with the impact receiving section 34 of the second exterior case 6 on the three o'clock side by the impact transmitted to the head contact section 36, whereby the external impact exerted on the operation head section 27 is received by the impact receiving section 34.

Accordingly, in the case of this wristwatch case 1, when the operation head section 27 of the operation member 22 of the switch device 3 on the three o'clock side is subjected to an external impact, the impact is received by the impact receiving section 34 of the second exterior case 6 on the three o'clock side, whereby the operation shaft 26 of the operation member 22 is prevented from being pushed into the timepiece module 7 by the impact.

Thus, in the case of this wristwatch case 1, even if the operation head section 27 is subjected to an external impact, the timepiece module 7 is prevented from being damaged by the operation shaft 26. As a result of this structure, the outer head section 32 of the operation head section 27 can be protruded outside of the protection projection 35*a*, whereby the outer circumferential portion of the outer head section 32 can be easily held, which enhances the operability of the operation head section 27.

In the above-described embodiment, the impact receiving sections 34 are provided diagonally to each other on the three o'clock side and nine o'clock side of the second exterior case 6. However, the present invention is not limited thereto. For example, a structure may be adopted in which the impact receiving sections 34 are provided diagonally to each other on the two o'clock side and the eight o'clock side, or the four o'clock side and the ten o'clock side. Also, the present invention is not limited thereto, and a structure may be adopted in which the impact receiving sections 34 are provided on two areas including an area ranging from the two o'clock side to the four o'clock side and an area ranging from the eight o'clock side to the ten o'clock side.

Also, in the above-described embodiment, the second exterior case provided with the impact receiving sections 34 is arranged on the upper part of the first exterior case 5.

However, the present invention is not limited thereto, and a structure may be adopted in which a second exterior case provided with impact receiving sections is arranged not only on the upper part of the first exterior case 5 but also on the lower part thereof. By this structure as well, the impact resistance can be enhanced.

Figure 6:
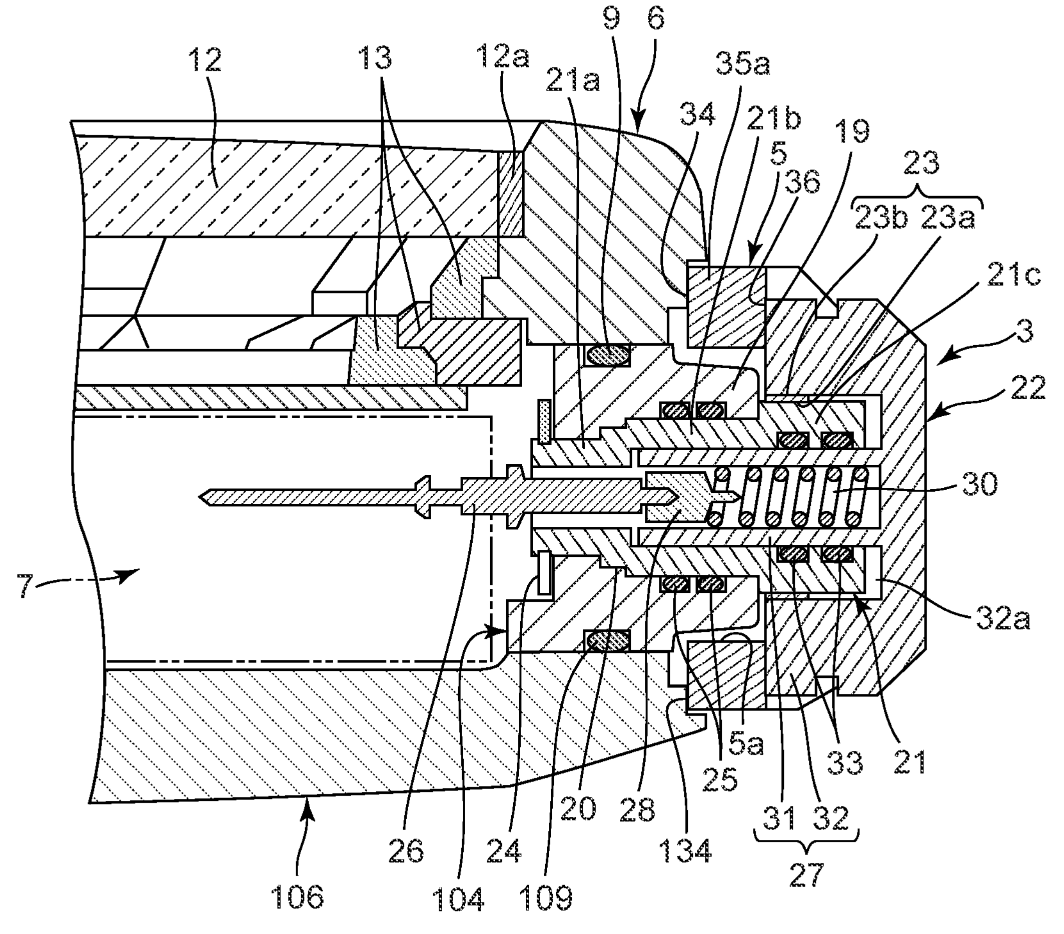
FIG. 6 is a cross-sectional view of a modification of the wristwatch shown in FIG. 5.

FIG. 6 is a diagram showing an example of this structure. Note that sections that are the same as those of the above-described wristwatch case 1 are provided with the same reference numerals, and explanations thereof are omitted. In this example, a case main body 104 which houses the timepiece module 7 is open upward and downward, and the bottom of the case main body 104 is covered by another second exterior case 106 which is different from the above-described second exterior case 6 and arranged on the lower end of the case main body 104. This additional second exterior case 106 is referred to as the "lower second exterior case 106" so as to be differentiated from the above-described second exterior case 6.

Although not shown in the drawing, the lower second exterior case 106 is attached to the first exterior case 5 by screw members, as in the case of the above-described second exterior case 6. Waterproofing between the lower end surface of the case main body 104 and the upper end surface of the lower second exterior case 106 is achieved by a case packing 109 whose diameter is equal to that of the above-described case packing 9. On two portions of the lower second exterior case 106 including a portion corresponding to the switch device 3 on the three o'clock side and a portion corresponding to the nine o'clock side which is located diagonally thereto, impact receiving sections 134 that are sections for receiving impacts are provided.

In the case of this structure, when the first exterior case 5 is subjected to an external impact, the inner end surface of the first exterior case 5 comes in contact with the impact receiving sections 134 of the lower second exterior case 106 in addition to the impact receiving sections 34 of the second exterior case 6 by the impact. As a result of this structure, external impacts can be received by the impact receiving sections 34 and 134 of the second exterior case 6 and the lower second exterior case 106, whereby the case main body 4 is not subjected to the external impacts. That is, the impact resistance for the case main body 4 is enhanced. Note that the arrangement positions of the impact receiving sections 134 of the lower second exterior case 106 are not limited to the three o'clock side and the nine o'clock side and may be changed as necessary, as described above with respect to the second exterior case 6.

Also, the present invention is not limited to the above-described structures, and a structure may be adopted in which a second exterior case provided with impact receiving sections is provided only on the lower part of the first exterior case 5. For example, in a case where this structure is adopted in the wristwatch case 1 of FIG. 6, the impact receiving sections 34 of the second exterior case 6 are not provided and a space is formed between the inner end surface of the first exterior case 5 and the second exterior case 6.

Also, in the above-described embodiment, the present invention has been applied in a wristwatch. However, the present invention is not necessarily required to be applied in a wristwatch. For example, the present invention is applicable to various types of timepieces such as a travel watch, an alarm clock, a table clock, and a wall clock.

In addition, the present invention is not necessarily required to be applied in timepieces, and is applicable to electronic devices such as a portable telephone and a portable information terminal.

While the present invention has been described with reference to the preferred embodiments, it is intended that the invention be not limited by any of the details of the description therein but includes all the embodiments which fall within the scope of the appended claims.

What is claimed is:

1. A case comprising:
a case main body;
a first exterior case which is arranged around an outer circumferential portion of the case main body; and
a second exterior case which comes in contact with an upper surface of the case main body and is attached only to either of an upper part and a lower part of the first exterior case, and which includes an impact receiving portion with which an inner circumferential portion of the first exterior case comes in contact,
wherein the first exterior case is formed of a material whose rigidity is higher than a rigidity of the case main body.

2. The case according to claim 1, wherein the second exterior case is formed such that a thickness of a circumferential portion thereof is greater than a thickness of a circumferential portion of the first exterior case.

3. The case according to claim 1, wherein a groove is formed in the upper surface of the case main body, the groove is provided with a packing, and the case main body and the second exterior case come in contact with each other via the packing.

4. The case according to claim 2, wherein a groove is formed in the upper surface of the case main body, the groove is provided with a packing, and the case main body and the second exterior case come in contact with each other via the packing.

5. The case according to claim 1, wherein a portion of the second exterior case is arranged on the first exterior case.

6. The case according to claim 2, wherein a portion of the second exterior case is arranged on the first exterior case.

7. The case according to claim 3, wherein a portion of the second exterior case is arranged on the first exterior case.

8. The case according to claim 4, wherein a portion of the second exterior case is arranged on the first exterior case.

9. The case according to claim 1, wherein the impact receiving portion of the second exterior case is plurally provided such that impact receiving portions are positioned diagonally to each other.

10. The case according to claim 2, wherein the impact receiving portion of the second exterior case is plurally provided such that impact receiving portions are positioned diagonally to each other.

11. The case according to claim 3, wherein the impact receiving portion of the second exterior case is plurally provided such that impact receiving portions are positioned diagonally to each other.

12. The case according to claim 4, wherein the impact receiving portion of the second exterior case is plurally provided such that impact receiving portions are positioned diagonally to each other.

13. The case according to claim 1, wherein the case main body is provided with a switch device,
wherein the first exterior case is provided with a protection projection which protects an operation head portion of the switch device, and
wherein the impact receiving portion of the second exterior case is plurally provided such that impact receiving portions are positioned diagonally to each other while corresponding to the protection projection of the first exterior case.

14. The case according to claim 2, wherein the case main body is provided with a switch device,
wherein the first exterior case is provided with a protection projection which protects an operation head portion of the switch device, and
wherein the impact receiving portion of the second exterior case is plurally provided such that impact receiving portions are positioned diagonally to each other while corresponding to the protection projection of the first exterior case.

15. The case according to claim 3, wherein the case main body is provided with a switch device,
wherein the first exterior case is provided with a protection projection which protects an operation head portion of the switch device, and
wherein the impact receiving portion of the second exterior case is plurally provided such that impact receiving portions are positioned diagonally to each other while corresponding to the protection projection of the first exterior case.

16. The case according to claim 4, wherein the case main body is provided with a switch device,
wherein the first exterior case is provided with a protection projection which protects an operation head portion of the switch device, and
wherein the impact receiving portion of the second exterior case is plurally provided such that impact receiving portions are positioned diagonally to each other while corresponding to the protection projection of the first exterior case.

17. The case according to claim 13, wherein the protection projection of the first exterior case is provided with a contact portion with which an inner end of the operation head portion of the switch device comes in contact.

18. The case according to claim 14, wherein the protection projection of the first exterior case is provided with a contact portion with which an inner end of the operation head portion of the switch device comes in contact.

19. A timepiece comprising the case according to claim 1.

20. The case according to claim 19, wherein the impact receiving portion of the second exterior case is plurally provided such that impact receiving portions are positioned diagonally to each other on a three o'clock side and a nine o'clock side, respectively.

21. The case according to claim 1, wherein the impact receiving portion and the second exterior case are formed of a same material and integrally formed.

* * * * *